(12) United States Patent
Schulz

(10) Patent No.: US 9,424,073 B1
(45) Date of Patent: Aug. 23, 2016

(54) TRANSACTION HANDLING BETWEEN SOFT LOGIC AND HARD LOGIC COMPONENTS OF A MEMORY CONTROLLER

(71) Applicant: Altera Corporation, San Jose, CA (US)

(72) Inventor: Jeffrey Schulz, Milpitas, CA (US)

(73) Assignee: Altera Corporation, San Jose, CA (US)

( * ) Notice: Subject to any disclaimer, the term of this patent is extended or adjusted under 35 U.S.C. 154(b) by 141 days.

(21) Appl. No.: 14/297,455

(22) Filed: Jun. 5, 2014

(51) Int. Cl.
*G06F 13/16* (2006.01)
*G06F 9/46* (2006.01)

(52) U.S. Cl.
CPC .................................. *G06F 9/467* (2013.01)

(58) Field of Classification Search
None
See application file for complete search history.

(56) References Cited

U.S. PATENT DOCUMENTS

| | | | |
|---|---|---|---|
| 7,490,209 B1* | 2/2009 | Charagulla | G06F 13/1668 711/167 |
| 8,347,005 B2* | 1/2013 | Bresniker | G06F 13/1694 710/74 |
| 8,495,330 B2* | 7/2013 | Vergis | G06F 13/1694 711/170 |
| 2013/0138911 A1* | 5/2013 | Gopalakrishnan | G06F 12/0646 711/170 |

* cited by examiner

*Primary Examiner* — Gary Portka
(74) *Attorney, Agent, or Firm* — Fletcher Yoder, P.C.

(57) ABSTRACT

Techniques and mechanisms handle transactions between various components of a memory controller. For example, a memory controller may include a component implemented in configurable logic and another component implemented in hard logic.

17 Claims, 8 Drawing Sheets

TRANSACTION HANDLING BETWEEN SOFT LOGIC AND HARD LOGIC COMPONENTS OF A MEMORY CONTROLLER

TECHNICAL FIELD

This disclosure generally relates to integrated circuits. More specifically, the disclosure relates to systems and methods for managing transactions between soft logic and hard logic components of a memory controller.

DESCRIPTION OF THE RELATED TECHNOLOGY

A programmable logic device (PLD) is a semiconductor integrated circuit which contains logic circuitry and routing that may be configured to perform a host of logic functions. In a typical scenario, a designer uses electronic design automation (EDA) tools to create a design. These tools use information regarding the hardware capabilities of a given programmable logic device to help the designer implement the custom logic using multiple resources available on that given programmable logic device.

In some scenarios, a designer of a PLD may want logic in the PLD to interface with one or more memory units. In such scenarios, a memory controller may manage the transactions between master units in the PLD and the memory units.

SUMMARY

The subject matter described herein provides a technique for a device, such as a programmable logic device (PLD), to support an interface between soft logic and hard logic components of a memory controller.

In some scenarios, a designer of a PLD may include logic in the PLD that may interface with one or more memory units. For instance, a master unit in the configurable, or soft, logic of the PLD may issue a write command to a memory unit. The issued transaction indicating a write to the memory unit may be provided to a memory controller. Other transactions may also be received from the same or other masters in the PLD.

Often, memory controllers may require a large amount of logic to communicate between masters and memory units. In some implementations, the memory controller may be implemented in the configurable, or soft, logic of the PLD. However, implementation of logic in the configurable logic of the PLD often brings additional overhead, and therefore, reduces the availability of configurable logic for other functionality. In other implementations, the memory controller may be implemented in hard logic, for example, in the periphery of the PLD. However, implementing the controller in hard logic may reduce customization of the controller for a particular application.

In one example, a memory controller may include a hard logic component (i.e., implemented as an ASIC or fixed circuitry) and a soft logic component (i.e., implemented in the configurable logic of a PLD).

These and other features will be presented in more detail in the following specification and the accompanying figures, which illustrate by way of example.

DETAILED DESCRIPTION OF PARTICULAR EMBODIMENTS

The techniques and mechanisms disclosed herein are primarily described with reference to programmable logic devices (PLDs) such as Field Programmable Gate Arrays (FPGAs), but are not necessarily limited to PLDs. The present disclosure provides examples of several, but not all, configurations.

Figure 1:
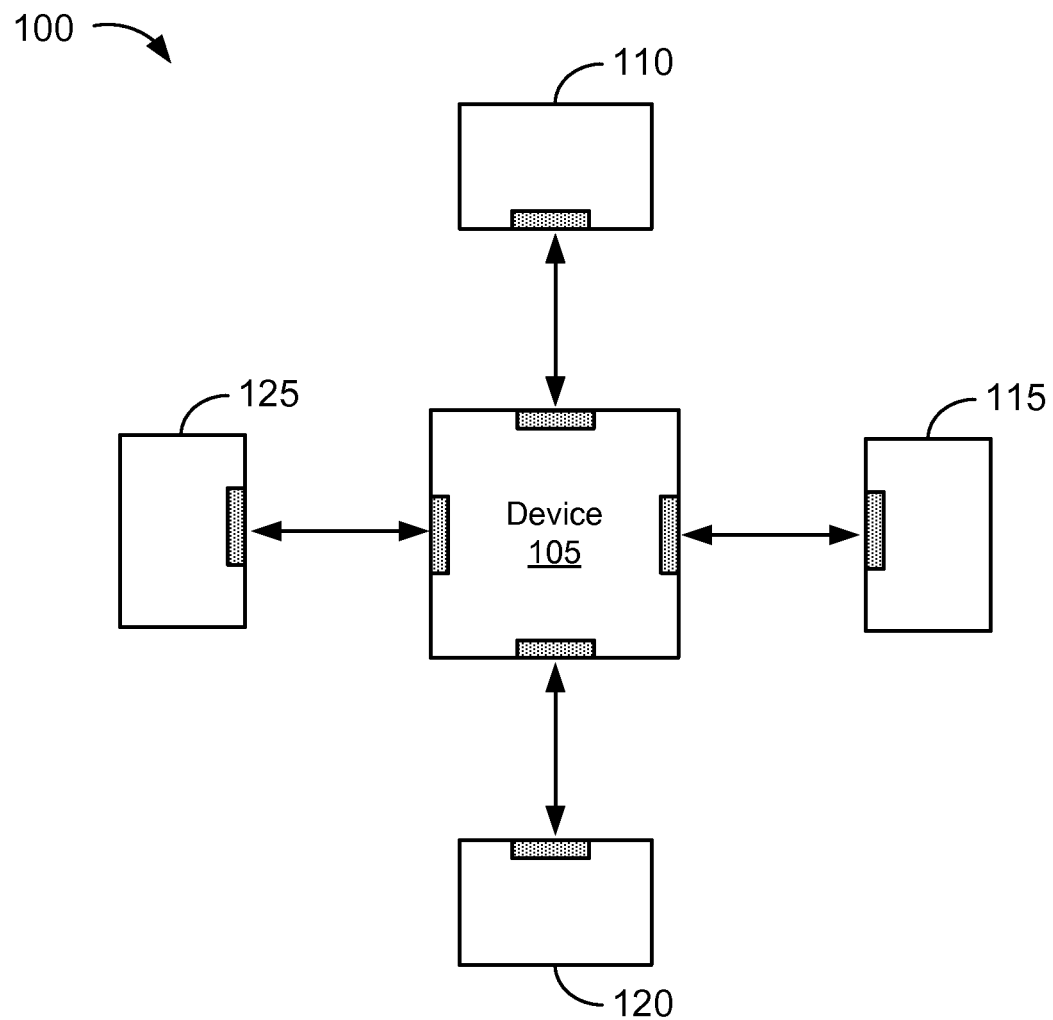
FIG. 1 illustrates a schematic of a device communicating with memory units in accordance with some implementations.

FIG. 1A illustrates an example of a schematic of a device communicating with memory units. In the implementation of FIG. 1A, system 100 includes device 105 interfacing with a variety of memory units 110, 115, 120, and 125. Memory units 110, 115, 120, and 125 may be the same or different types of memories. For example, memory units 110, 115, 120, and 125 may be any combination of DRAM (e.g., DDR4, RMDRAM3, etc.), static random-access memory (SRAM), non-volatile random-access memory (NVRAM), reduced-latency dynamic random access memory (RL-DRAM), or other memories. In some implementations, device 105 may include one or more master units that provide transactions (e.g., read or write commands) to memory units 110, 115, 120, and 125. One or more memory controllers may manage the transactions between the master units and the memory units.

Different memory types may require different logic to properly communicate with master units implemented in device 105. For example, dual date rate (DDR) may require a substantially different memory controller implementation than RLDRAM.

Additionally, different systems may implement different policies and/or buses when managing transactions. For example, transactions providing read or write commands to the memory units may be received from multiple master units in device 105. For one system design, if commands are received from multiple masters, a priority scheme may be used to determine which command may be handled by the memory controller and provided to a memory unit first. However, another system design may include a different priority scheme.

Moreover, in some systems, a different number of memory units may be used. For example, in system 100 of FIG. 1, four memory units are provided. However, in other systems, a single memory unit may be used. In other implementations, more than four units may be used. For example, in some implementations, such as 2.5 DRAM, a high number of memory units may be interfacing with a device.

Figure 2A:
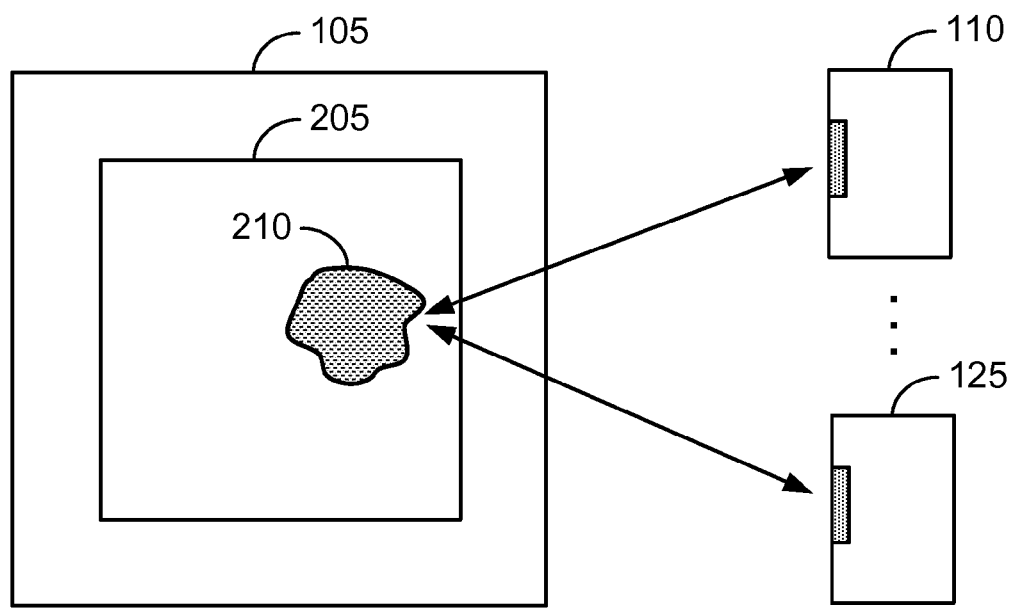
FIG. 2A illustrates a memory controller implemented in configurable logic in accordance with some implementations.

FIG. 2A illustrates an example of a memory controller implemented in configurable logic. In FIG. 2A, device 105 includes soft logic 205. In some implementations, soft logic 205 may be the configurable logic of an FPGA. Memory controller 210 in FIG. 2A is implemented in soft logic 205. Accordingly, memory controller 210 in soft logic 205 may receive transactions from master units and provide an interface to communicate with memory units 110, 115, 120, and 125.

In the implementation of FIG. 2A, all of memory controller 210 is implemented in soft logic 205. As such, memory controller 210 may be customized to properly interface with each of memory units 110, 115, 120, and 125. Additionally, memory controller 210 may be configured in soft logic 205 to implement a particular policy for managing transactions received and/or directed to master units implemented in device 105.

For example, if memory units 110, 115, 120, and 125 all require a DDR protocol rather than a RLDRAM protocol, memory controller 210 in soft logic 205 may be customized to only provide logic associated with DDR rather than both DDR and RLDRAM memory types.

However, the implementation of FIG. 2A may provide a high amount of overhead. For example, configuring the logic for memory controller 210 in soft logic 205 may take a high amount of resources associated with soft logic 205. That is, for example, the placement and routing associated with memory controller 210 in soft logic 205 may reduce the availability of resources for other logic needing to be implemented in soft logic 205. Additionally, the performance of memory controller 210 implemented in soft logic 205 may also be lower than an implementation in hard logic.

Figure 2B:
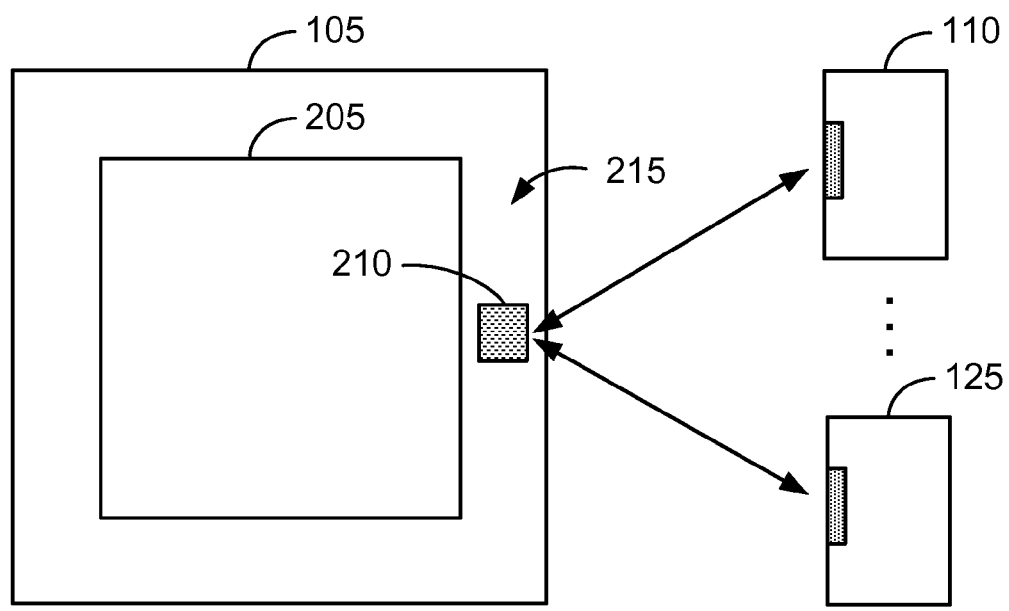
FIG. 2B illustrates a memory controller implemented in hard logic in accordance with some implementations.

FIG. 2B illustrates an example of a memory controller implemented in hard logic. In FIG. 2B, device 105 also includes soft logic 205. In some implementations, soft logic 205 may be the configurable logic of an FPGA. However, memory controller 210 in FIG. 2B is implemented in hard logic 215 rather than soft logic 205 as in the implementation of FIG. 2A. Accordingly, memory controller 210 in hard logic 215 may receive transactions from master units and provide an interface to communicate with memory units 110, 115, 120, and 125.

In the implementation of FIG. 2B, all of memory controller 210 is implemented in hard logic 215. As such, memory controller 210 may be specifically designed, for example as an application specific integrated circuit (ASIC), to interface with each of memory units 110, 115, 120, and 125. Additionally, memory controller 210 in hard logic 215 may also implement a particular policy for managing transactions received and/or directed to master units implemented in device 105.

In some implementations, the implementation of memory controller 210 in hard logic 215 may occupy less area of the chip die than being implemented in soft logic 205 as in FIG. 2A. Moreover, implementation in hard logic 215 may offer better performance than implementation in soft logic 205. Additionally, implementation of memory controller 210 in hard logic 215 can make more resources within soft logic 205 available for other logic to be implemented. For example, more master units or any other type of logic may be implemented in soft logic 205.

However, the implementation of FIG. 2B may, in some scenarios, require logic supporting multiple types of memory types. For example, if device 105 is to be compatible with RLDRAM and DDR, then memory controller 210 implemented in hard logic 215 may need to implement different logical functionalities for the multiple types of memories. However, in some system designs, only a single type of memory may be needed, and therefore, a portion of memory controller 210 may be wasted. Additionally, if a designer does not wish to interface device 105 with a memory unit, or less memory units than memory controller 210 is configured to work with, then the implementation of memory controller 210 in hard logic 215 may be inefficient. Moreover, the designer may want to interface device 105 with more memory units than memory controller 210 implemented in hard logic 215 is designed to work with. Device 105 may also be limited to interfacing with memory types that memory controller 210 has been designed to be compatible with. Therefore, if a new memory standard is released, device 105 may be incompatible with the new standard.

In some scenarios, the portion of memory controller 210 dedicated to custom logic implementing a particular policy or interface for a particular type of memory may be upwards of 85% of the logic of memory controller 210. Approximately 15% of memory controller 210 may be dedicated to operations common to many memory types. For example, many DRAM memory types (e.g., DDR, RLDRAM, etc.) may include a subset of functionality that is common between them. Accordingly, a memory controller may be split among soft logic 205 and hard logic 215. That is, a portion of a memory controller associated with custom logic associated with a particular memory type and a custom bus policy may be configured in soft logic 205. The portion of the memory controller associated with dedicated logic associated with multiple memory types may be designed in hard logic 215.

Figure 2C:
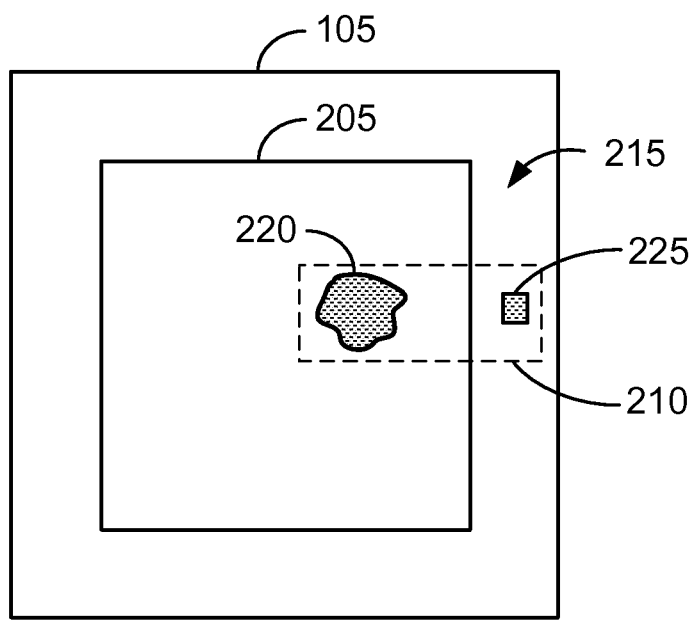
FIG. 2C illustrates a memory controller with components implemented in configurable logic and hard logic in accordance with some implementations.

As an example, FIG. 2C illustrates a memory controller with components implemented in soft logic 205 and hard logic 215. In FIG. 2C, the memory controller 210 includes two components: memory controller soft logic component 220 implemented in soft logic 205 and memory controller hard logic component 225 implemented in hard logic 215. That is, functionality of the memory controller 210 in FIG. 2C includes logic implemented in soft logic 205 and hard logic 215 rather than only soft logic 205 or only hard logic 215.

In some implementations, memory controller soft logic component 220 may include customized logic for a particular application of device 105. For example, if device 105 is to interface only with DDR memories, then logic allowing a master in device 105 to communicate with a DDR memory unit may be included in memory controller soft logic component 220. However, logic allowing device 105 to properly interface with a RLDRAM memory may not be implemented, and therefore, increase the availability of resources for placement and routing of other logic.

Moreover, memory controller hard logic component 225 may include standardized or common logic between different memory types. That is, certain types of logic or functionality may be common between different memory types, and therefore, may be implemented in memory controller hard logic component 225 in hard logic 215. Accordingly, memory controller soft logic component 220 may include customizable logic that may be different between different buses, memories, and applications of device 105. Memory controller hard logic component 225 may include common logic or functionality between different buses, memories, and applications of device 105.

In some implementations, memory controller soft logic component 220 may be smaller than the implementation of memory controller 210 in soft logic 205 in FIG. 2A. That is, memory controller soft logic component 220 in FIG. 2C may utilize less resources within soft logic 205 than memory controller 210 in FIG. 2A. Likewise, memory controller hard logic component 225 in FIG. 2C may be smaller than the implementation of memory controller 210 in hard logic 215 in FIG. 2B. That is, memory controller hard logic component 225 may take less area and include less circuitry than memory controller 210 within hard logic 215 of FIG. 2B.

Figure 3A:
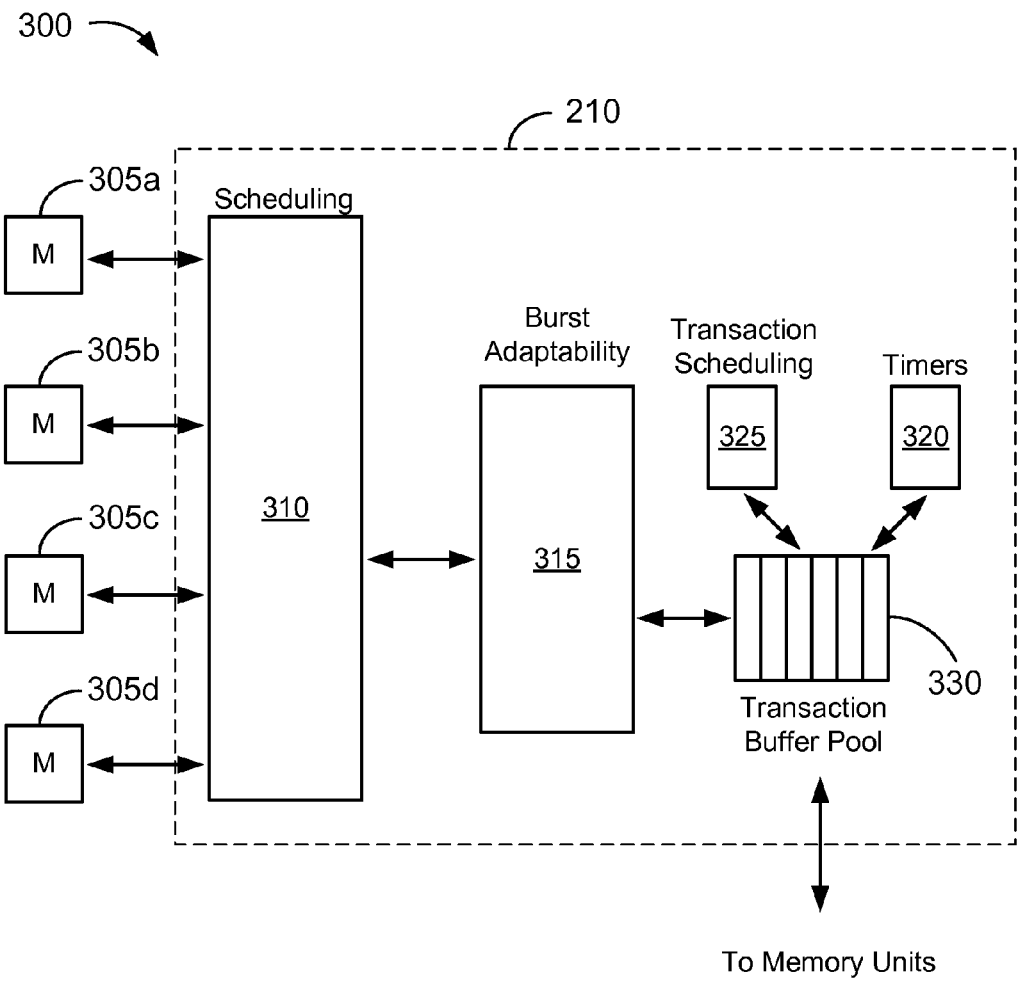
FIG. 3A illustrates a schematic of a memory controller in accordance with some implementations.

FIG. 3A illustrates a schematic of a memory controller in accordance with some implementations. In FIG. 3A, memory controller 210 communicates with a variety of master units 305*a*, 305*b*, 305*c*, and 305*d*. Memory controller 210 also communicates with a variety of memory units.

In some implementations, master units 305*a-d* may transmit a variety of transactions to memory controller 210. For example, master unit 305*a* may transmit a read command from a particular address in a particular memory unit. Master unit 305*b* may transmit a write command to a particular address in a particular memory unit. Likewise, master units 305*c* and 305*d* may also transmit commands.

Scheduling unit 310 of memory controller 210 may schedule the transactions to be transmitted to the memory units in a particular order in accordance with a priority scheme. As previously discussed, different bus interconnect implementations may involve different priority schemes. For example, in some bus implementations, master unit 305*a* may be designated as having a higher priority than master unit 305*b*, and therefore, transactions from master unit 305*a* should be first attempted to be transmitted to a memory unit than transactions from master unit 305*b*. However, another implementation may have the first eight transactions from master unit 305*a* prioritized over transactions from master unit 305*b*. After the first eight transactions from master unit 305*a*, transactions from master unit 305*b* may be prioritized. Accordingly, the implementation of scheduling unit 310 may be specific for each particular use.

Burst adaptability unit 315 may also include logic specific for different uses. In some implementations, memory units may require fixed-length transactions of a particular size. However, based on the design of master units 305*a-d*, transactions may be of a different size. That is, transactions received from master units 305*a-d* may need to be fragmented into smaller sizes (i.e., fragment a transaction from a master unit into multiple individual transactions) or padded to larger sizes (i.e., combine multiple transactions from a master unit into a single transaction) in order to be compatible with an interface for a particular memory unit of a particular memory type. Accordingly, the implementation of burst adaptability unit 315 may also be specific for each particular use.

Transaction scheduling unit 325 of memory controller 210 may also include logic that may be specific for different memory types or bus interconnect types. In some implementations, memory controller 210 may receive multiple transactions. For example, a first transaction, a second transaction, and a third transaction may be received in that order. However, transaction scheduling unit 325 may reorder the transactions such that they are issued in a different order.

For example, transactions one and two may be issued to a first DRAM bank. Transaction three may be issued to a second DRAM bank. Generally, before the second transaction may be provided to the first DRAM bank, the first transaction may need to be issued, acted upon, and cleanup operations performed. However, since transaction three is associated with a different DRAM bank (i.e., the second DRAM bank rather than the first DRAM bank), transaction scheduling unit 325 may reschedule transaction three to be issued after transaction one. Accordingly, transaction one may be issued to the first DRAM bank, followed by the issuance of transaction three to the second DRAM bank. The second transaction may be issued after the third transaction when the first transaction is finished.

In some implementations, transaction scheduling unit 325 may also reorder transactions received from any memory units for systems utilizing an interconnect bus expecting transactions to come back in a particular order. For example, a master unit may transmit three transactions. Transaction scheduling unit 325 may reschedule the transactions to the DRAM banks such that the third transaction may be issued between the issuance of the first transaction and the second transaction. However, if, for example, all of the transactions are read commands, then the master unit may be expecting all of the transactions to be returning in the same order as issued. Accordingly, transaction scheduling unit 325 may delay transmitting the third transaction back to the master unit until the second transaction is received and transmitted back. As such, the implementation of transaction scheduling unit 325 may also be specific for particular uses.

In an implementation, because scheduling unit 310, burst adaptability 315, and transaction scheduling 325 include logic that may be customized for different applications (e.g., different bus interconnects, memory types, etc.), they may be implemented in soft logic 205. For example, in some designs, only two master units may be implemented and providing transactions. In other designs, four master units may be implemented and providing transactions. Accordingly, the implementation with four master units may have more logic associated with scheduling unit 310, burst adaptability 315, and transaction scheduling 325 than the implementation with two master units because four master units may include scheduling, prioritizing, etc. between transactions from more master units. Additionally, different implementations may include different prioritizing schemes, as previously discussed. Because scheduling unit 310, burst adaptability 315, and transaction scheduling 325 may be implemented in soft logic 205, only the schemes for the particular application may be implemented. As such, less of the resources available for placement and routing may be utilized, and therefore, more of soft logic 205 may be available for other applications. For example, wider data paths, more master units, or more complicated priority schemes or algorithms may be available to be implemented in soft logic 205.

However, in some implementations, the logic associated with transaction buffer pool 330 and timers 320 may be common to many memory types and bus interfaces rather than being specific or customized to a particular implementation.

For example, transaction buffer pool 330 may receive transactions from burst adaptability unit 315. Accordingly, transaction buffer pool 330 may store the transactions received from master units 305*a-d*. As previously discussed, the transactions may be prioritized by scheduling unit 310 and fragmented by burst adaptability 315. Additionally, transactions may be transmitted to memory banks or memory units in a different order due to input from transaction scheduling unit 325, as previously discussed.

Timers 320 may also be common to many different bus interconnects and memory types. In an implementation, timers 320 may include the availability of a transaction to change to another state. For example, a transaction may be associated with a variety of states in a series of states. In an implementation, transactions states may progress through and include "empty," "waiting bank allocation," "granted bank," "read/write," and "bank cleanup." Empty may indicate that transaction buffer pool 330 does not include a transaction for the "slot" or spot for the transaction, and therefore, may be able to receive a transaction to put in. Waiting bank allocation may indicate that the transaction is waiting for a bank to be available to read or write to, as previously discussed. When a bank is granted to a transaction in transaction buffer pool 330, the transaction may progress to the granted bank state. Read/write may indicate that the transaction is operating on a memory unit, and therefore, is writing or reading data. Bank cleanup may indicate a variety of operations to "cleanup" the transaction and make the memory unit or memory bank available to another transaction. In some implementations, transactions may progress through the states in an order of: "empty," "waiting bank allocation," "granted bank," "read/write," and "bank cleanup." In other implementations, additional states, less states, or a different order may be used.

In some implementations, timers 320 may also include a minimum number of clock cycles between transitioning between states. For example, a certain number of clock cycles may be needed between the "granted bank" state and the "read/write" state. In some implementations, each state transition may be associated with upwards of 10-15 counters that may need to be checked before a transaction is allowed to proceed to the next state.

Since the logic associated with transaction buffer pool 330 and timers 320 may be common to many memory types and bus interfaces rather than being specific or customized to a particular implementation, transaction buffer pool 330 and timers 320 may be implemented in hard logic 215 rather than soft logic 205. Accordingly, scheduling unit 310, burst adaptability 315, and transaction scheduling 325 may be associated with a first component of memory controller 210 that is implemented in soft logic 205. Transaction buffer pool 330 and timers 320 may be associated with a second component of memory controller 210 that is implemented in hard logic 215.

In some implementations, transaction buffer pool 330 may provide data regarding the transactions it may be holding. For example, transaction buffer pool 330 may provide a signal or assert a flag to burst adaptability unit 315 that it is "not full," and therefore, may store an additional transaction. Accordingly, burst adaptability unit 315 may provide a transaction to be stored in transaction buffer pool 330.

If burst adaptability unit 315 and transaction buffer pool 330 are both in hard or soft logic, then a flag indicating available capacity, such as "not full," may indicate that a single transaction may be stored in transaction buffer pool 330. However, if burst adaptability 315 and transaction buffer pool 330 are separately implemented in soft logic and hard logic, then additional data regarding transactions stored in transaction buffer pool 330 may be provided because, in some implementations, soft logic 205 may run slower than hard logic 215. Accordingly, the interface between soft logic 205 and hard logic 215 may be a bottleneck that can be reduced in order to provide more efficient handling of transactions between masters 305a-d and memory units handled by memory controller 210.

For example, transaction buffer pool 330 may be conceptualized as including a variety of "slots" for storing transactions. Accordingly, each slot may include a slot status associated with the state of the transaction as previously discussed (e.g., empty, waiting bank allocation, granted bank, read/write, and bank cleanup). Therefore, the state of each slot may be provided to burst adaptability unit 315 and/or transaction scheduling unit 325. That is, data regarding transaction buffer pool 330 in hard logic 215 may cross an interface between hard logic and soft logic to burst adaptability unit 315 and transaction scheduling unit 325.

Additionally, transaction buffer pool 330 may also provide the number of empty slots. That is, transaction buffer pool 330 may provide capacity data regarding the number of available slots. For example, rather than indicating that transaction buffer pool 330 is either full or not full, the number of available slots that may store a transaction may be provided to the units implemented in the soft logic component of memory controller 210. In some implementations, providing the number of available slots rather than a full or not full flag or signal may reduce the bottleneck between the interface between soft logic 205 and hard logic 215. For example, if it takes four clock cycles for the logic implemented in soft logic 205 to respond, then providing the number of available slots may allow burst adaptability unit 315 to send four back-to-back transactions rather than sending individual transactions based on a full/not full flag. Accordingly, providing the number of available slots may reduce the bottleneck at the interface between hard logic and soft logic.

In an implementation, transaction buffer pool 330 in hard logic may provide slot status data regarding transactions and empty slots to transaction scheduling unit 325 in soft logic. Transaction scheduling unit 325 may then indicate that a particular transaction may advance to a subsequent state. For example, a slot associated with a transaction may transmit data indicating that it is in the "waiting bank allocation" state. If transaction scheduling unit 325 determines that the transaction may advance to the "bank granted" state" data may be provided to transaction buffer pool 330 indicating that the transaction may advance to the "bank granted" state.

Figure 3B:
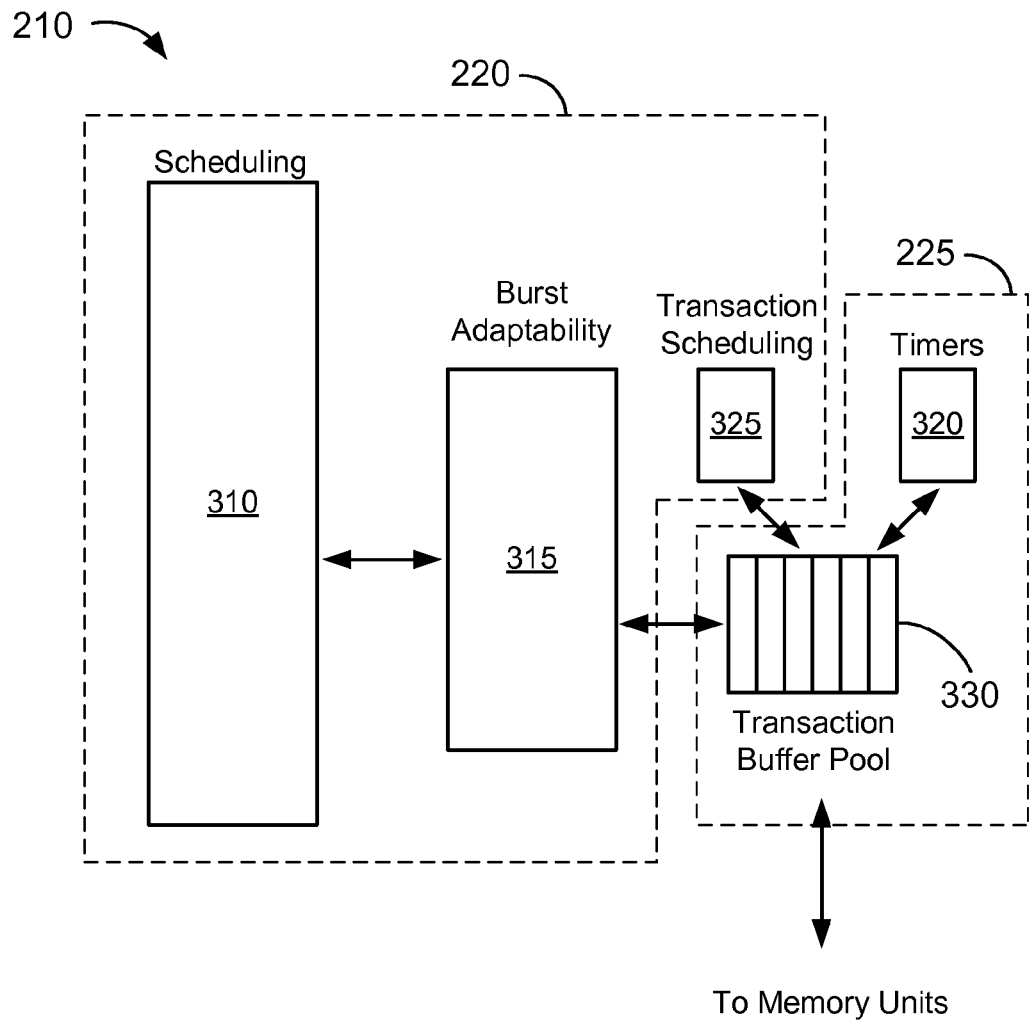
FIG. 3B illustrates another schematic of a memory controller in accordance with some implementations.

As such, the hard logic component of memory controller 210 may provide the number of available slots in transaction buffer pool 330, timer information for transactions, and the slot status of each slot or transaction. The soft logic component of memory controller 210 may provide transactions to load into transaction buffer pool 330 and provide data indicating that a transaction may advance to another state. As an example, FIG. 3B illustrates another schematic of a memory controller 210 in accordance with some implementations. In FIG. 3B, scheduling unit 310, burst adaptability unit 315, and transaction scheduling unit 325 may be included in memory controller soft logic component 220. Timers 320 and transaction buffer pool 330 may be included in memory controller hard logic component 225.

Figure 4:
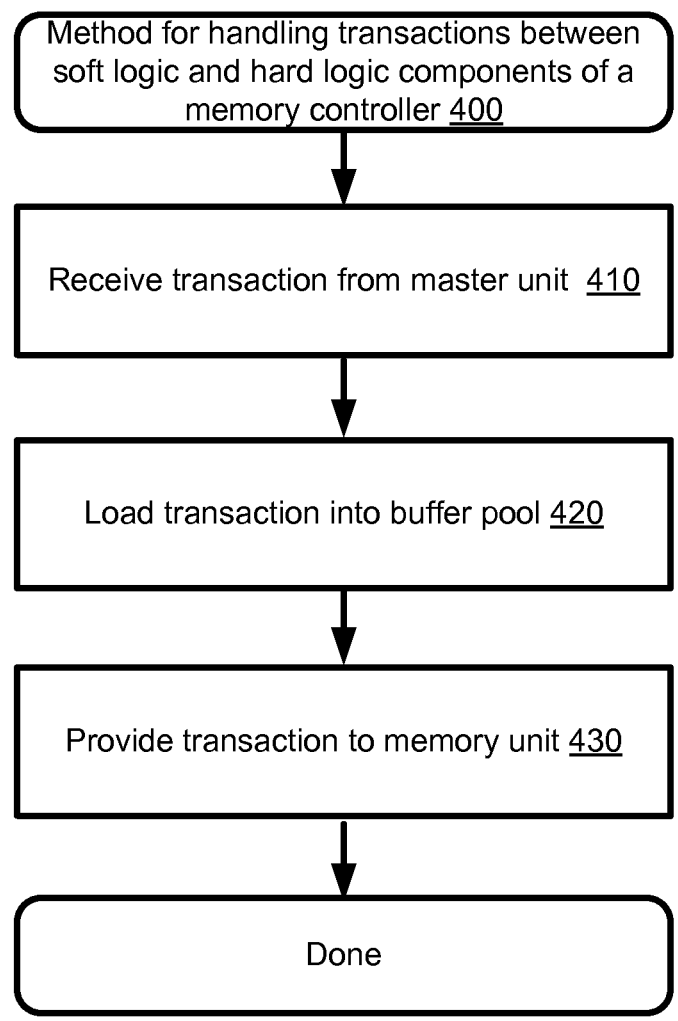
FIG. 4 is a flowchart illustrating a process flow for handling transactions between soft logic and hard logic components of a memory controller.

FIG. 4 is a flowchart illustrating a process flow for handling transactions between soft logic and hard logic components of a memory controller. In block 410 of method 400, a transaction (e.g., a read or write to an address in a memory unit) may be received from a master unit. At block 420, the transaction may be loaded into a transaction buffer pool. At block 430, the transaction in the transaction buffer pool may be provided to the memory unit indicated by the master unit.

Though some of the techniques and mechanisms herein are primarily described with reference to PLDs such as FPGAs, they are not necessarily limited to PLDs. The techniques and mechanisms may be implemented in hard logic and soft logic in a variety of configurations. Both hard logic and soft logic may be on a single device. Additionally, hard logic and soft logic may be on separate devices or chips. For example, a master unit may be on one device, a memory controller including hard and soft logic components on a second device, and a memory unit on a third device.

In some implementations, the logic disclosed herein may all be on hard logic. Alternatively, the logic may all be implemented in soft logic. In some implementations, scheduling unit 310, burst adaptability 315, transaction scheduling 325, transaction buffer pool 330, and timers 330 may be mixed among hard and/or soft logic. For example, scheduling unit 310 may be implemented in soft logic while burst adaptability unit 315, transaction scheduling unit 325, transaction buffer pool 330, and timers 320 may be implemented in hard logic. Accordingly, the units described may be implemented in hard logic or soft logic.

In an implementation, an electronic design automation (EDA) tool may be used to select a particular memory type. For example, a graphical user interface (GUI) may be used to select a particular type of memory, bus interconnect, and other settings that a system design may be interfacing with or using. Accordingly, the soft logic component of memory controller 210 may be generated and customized by the EDA tool and integrated into the user's design. In some implementations, the EDA tool may generate a configuration bit stream or other type of configuration file which may be used to configure the PLD to include the soft logic component of the memory controller. The generated soft logic component of the memory controller may, in the design, be coupled to the user design and the hard logic component of the memory controller. Accordingly, the soft logic component of the memory controller may include logic such that the memory controller may properly function with the selected memory type or types, bus interconnect, and other settings.

For example, a system design may include a master unit expecting to interface with a memory unit through a memory controller. If DDR4 DRAM is selected as the memory type, logic associated with scheduling unit 310, burst adaptability unit 315, and transaction scheduling unit 325 may be implemented in soft logic 205 such that the custom logic for DDR4 may be implemented correctly, and therefore, the master unit may communicate properly with a DDR4 memory unit. That is, the soft logic component of memory controller 210 may be implemented in the configurable logic such that it may communicate with the hard logic component of memory controller 210 to properly interface with the DDR4 memory unit. In some implementations, configuration data may be generated to include the soft logic component of memory controller 210 as well as couple the soft logic component with the hard logic component. Accordingly, configuration circuitry in the device may configure the soft logic component into soft logic 205 and couple it with the hard logic component.

In some implementations, a high-level synthesis tool may analyze software code and determine a type of memory controller suited for the implementation of the software code into the device. For example, a digital signal processing (DSP) algorithm may be developed in C code. A high-level synthesis tool, such as an OpenCL compiler, may synthesize structural logic providing the behavioral functionality of the code for implementation in the soft logic of the device. The high-level synthesis tool may also determine the amount of memory needed to implement the behavioral functionality of the software code into logic. Depending on the amount of memory needed, the memory may be mapped to on-chip memory or off-chip memory. For example, if the amount of memory needed exceeds on-chip memory, off-chip memory may be used.

Though the high-level code may provide behavioral functionality and provide references to data storage, variables, and other objects, the actual implementation of the memory controller is not provided in the code. Rather, the high-level synthesis tool may determine the type of memory, and therefore the type of controller, suited for the implementation of the high-level code in the device based on an analysis of the code.

In particular, certain types of memories may be better suited for different types of behavioral functionality that is synthesized by the high-synthesis tool. For example, if the high-level code has a regular and somewhat predictable memory access pattern, then implementing the synthesized software code to work with DDR may be determined. As an example, if memory addresses are to be sequentially accessed, DDR may provide better performance than RLDRAM, and therefore, the high-level synthesis tool may determine that some DDR memory controller (e.g., DDR4) functionality may be implemented in the soft logic, as previously discussed. If an analysis of the software code indicates that memory may be accessed in a random manner, then RLDRAM may be selected, and therefore, the high-level synthesis tool may determine that some RLDRAM memory controller functionality may be implemented in the soft logic, as previously discussed. Accordingly, the high-level synthesis tool may determine the address locality of the software code (e.g., DSP algorithm), and select a particular memory controller type based on level of address locality (i.e., a high address locality may select DDR whereas a low address locality may select RLDRAM)

In some implementations, after the high-level synthesis program (e.g., OpenCL compiler) selects the type of memory controller, portions of the memory controller may be implemented in the soft logic of the device by generating the appropriate configuration data, as previously discussed. In some implementations, the program may also ensure that the portion of the memory controller implemented in the soft logic may also meet particular timing requirements (e.g., operating frequency) such that the soft logic-implemented portions of the memory controller operate at a consistent performance. That is, regardless of the type of memory controller chosen, the soft logic component stays within particular operating parameters to smoothly interface with the hard logic components of the memory controller.

In some implementations, the type of memory controller may be dynamically changed (e.g., via partial reconfiguration). For example, the software code, when synthesized, may provide a first portion better suited for DDR memory and a second portion better suited for RLDRAM. When the logic associated with the first portion is being used, the memory controller portions in the soft logic may be implemented with DDR. When the logic associated with the second portion starts being used, the portion of the memory controller in the soft logic may be reconfigured to provide, for example, a controller for RLDRAM. Accordingly, an implementation may use different memory controller standards and switch between them.

In some implementations, address locality may be determined while the logic design corresponding to the software code is active. For example, as the logic design accesses memory addresses, patterns of high address locality and low address locality may be recognized. When a pattern of memory accesses correspond to a high address locality, the memory controller components in soft logic may be reconfigured to provide a memory controller better suited for high address locality (e.g., DDR). When a pattern of memory accesses correspond to a low address locality, the memory controller components in soft logic may be reconfigured to provide a memory controller better suited for low address locality (e.g., RLDRAM). In some implementations, the memory controller components in soft logic are reconfigured upon a number of continuous memory accesses corresponding to a certain type of locality (i.e., high or low) meeting a threshold number. For example, 100 straight memory accesses with high address locality may cause the soft logic to be reconfigured to provide functionality associated with a DDR memory controller. In other implementations, the number of memory accesses that correspond to both high address locality and low address locality are recorded and the one with the highest number of accesses is used to determine the memory controller to be implemented. When the type of memory accesses switches (e.g., from majority high address locality accesses to majority low address locality accesses), then a new memory controller may be reconfigured, as discussed above.

Additionally, the type of memory controller used may be selected based on a simulation of the software code or the synthesized logic corresponding to the software code. For example, address locality may be determined through simulation rather than an analysis of the software code. If the simulation shows a low address locality, then RLDRAM may be selected even if a preliminary analysis of the code (i.e., before the simulation) suggests that a high address locality may exist. Accordingly, simulation data may be used to select the type of memory controller.

Figure 5:
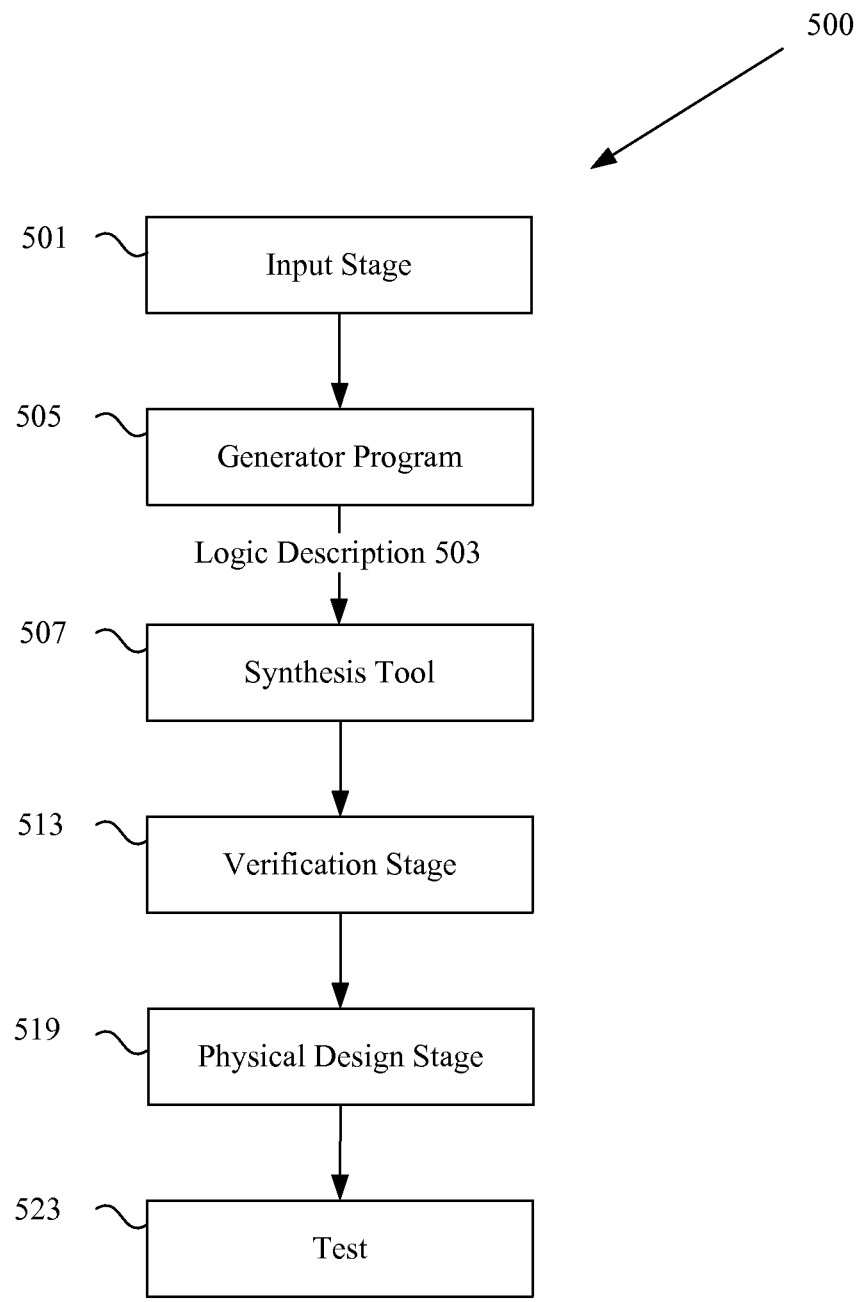
FIG. 5 illustrates a technique for implementing a programmable chip.

As previously discussed, various components may be implemented in soft logic of a programmable chip. FIG. 5 illustrates a technique for implementing a programmable chip. An input stage 501 receives selection information typically from a user for logic such as a processor core as well as other components to be implemented on an electronic device. In one example, the input received is in the form of a high-level language program. A generator program 505 creates a logic description and provides the logic description along with other customized logic to any of a variety of synthesis tools, place and route programs, and logic configuration tools to allow a logic description to be implemented on an electronic device.

In one example, an input stage 501 often allows selection and parameterization of components to be used on an electronic device. The input stage 501 also allows configuration of hard coded logic. In some examples, components provided to an input stage include intellectual property functions, megafunctions, and intellectual property cores. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various modules selected. At this stage, the user may enter security information about individual components that needs to be isolated. For example, different levels of component security and which components are allowed to communicate with each other may be entered.

In typical implementations, the generator program 505 can identify the selections and generate a logic description with information for implementing the various modules. The generator program 505 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 505 identifies pointers and provides ports for each pointer. One tool with generator program capabilities is System on a Programmable Chip (SOPC) Builder available from Altera Corporation of San Jose, Calif. The generator program 505 also provides information to a synthesis tool 507 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 523.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 6:
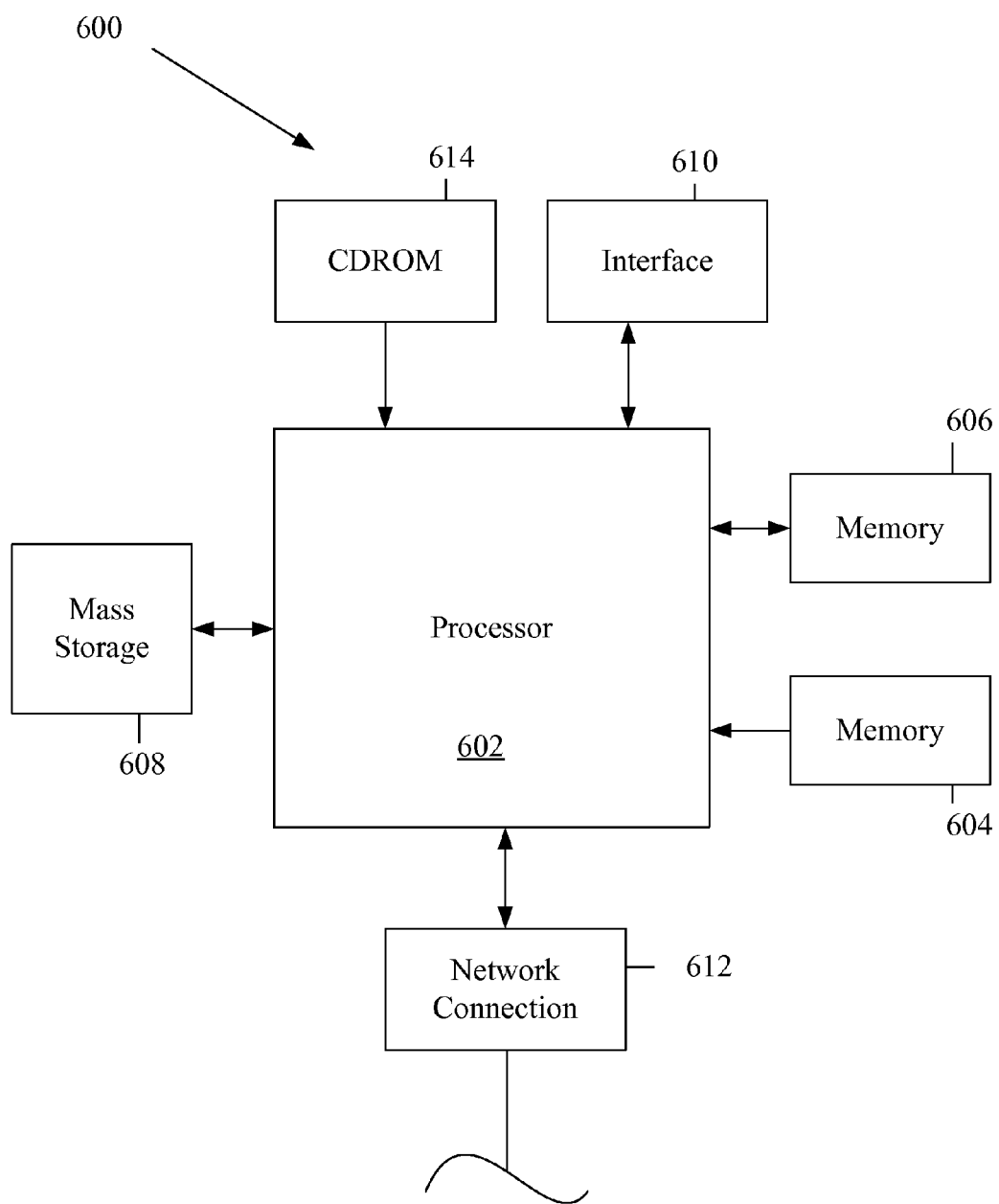
FIG. 6 illustrates one example of a computer system.

FIG. 6 illustrates one example of a computer system. The computer system 600 includes any number of processors 602 (also referred to as central processing units, or CPUs) that are coupled to devices including memory 606 (typically a random access memory, or "RAM"), memory 604 (typically a read only memory, or "ROM"). The processors 602 can be configured to generate an electronic design. As is well known in the art, memory 604 acts to transfer data and instructions uni-directionally to the CPU and memory 606 are used typically to transfer data and instructions in a bi-directional manner.

Both of these memory devices may include any suitable type of the computer-readable media described above. A mass storage device 608 is also coupled bi-directionally to CPU 1102 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 602 may be a design tool processor. Finally, CPU 602 optionally may be coupled to a computer or telecommunications network using a network connection as shown generally at 612. With such a network connection, it is contemplated that the CPU might receive information from the network, or might output information to the network in the course of performing the above-described process steps. It should be noted that the system 600 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A memory controller circuit comprising:
a first component of the memory controller circuit in configurable logic, the first component providing functionality associated with a first memory type; and
a second component of the memory controller circuit implemented in hard logic, the second component providing functionality associated with a plurality of memory types including the first memory type, wherein the second component includes a transaction buffer pool configured to store transactions received from a memory based on the first memory type, and the second component provides capacity information associated with the transaction buffer pool to the first component to manage transactions between the first component implemented in the configurable logic and the second component implemented in the hard logic.

2. The circuit of claim 1, wherein the first component includes a burst adaptability unit configured to provide transactions to the second component.

3. The circuit of claim 2, wherein the second component includes the transaction buffer pool and is configured to store transactions provided by the burst adaptability unit in the first component.

4. The circuit of claim 1, wherein the capacity information includes a number of transactions available to be stored in the transaction buffer pool.

5. The circuit of claim 1, wherein the second component provides, to the first component, status information regarding transactions stored in the transaction buffer pool.

6. The circuit of claim 5, wherein the status information includes a state of the transaction among a series of states.

7. The circuit of claim 1, wherein the plurality of memory types includes a second memory type, and the first component is incompatible with the second memory type.

8. A method for implementing a memory controller, the method comprising:

generating, by a processor, configuration data including a first component of the memory controller, wherein the first component is associated with a first memory type, wherein the first component is implemented in configurable logic, and wherein the first component is configured to communicate with a second component of the memory controller implemented in hard logic, wherein the second component is associated with a plurality of memory types including the first memory type, wherein the second component includes a transaction buffer pool configured to store transactions received from a memory based on the first memory type, and the second component provides capacity information associated with the transaction buffer pool to the first component to manage transactions between the first component implemented in the configurable logic and the second component implemented in the hard logic.

9. The method of claim 8, wherein the first component includes a burst adaptability unit configured to provide transactions to the second component.

10. The method of claim 9, wherein the second component includes the transaction buffer pool configured to store transactions provided by the burst adaptability unit in the first component.

11. The method of claim 8, wherein the capacity information includes a number of transactions available to be stored in the transaction buffer pool.

12. The method of claim 8, wherein the second component provides, to the first component, status information regarding transactions stored in the transaction buffer pool.

13. The method of claim 12, wherein the status information includes a state of the transaction among a series of states.

14. The method of claim 12, wherein the first component provides, to the second component, an indication that the state of a selected transaction can advance to the next state in the series of states.

15. The method of claim 8, wherein the plurality of memory types includes a second memory type, and the first component is incompatible with the second memory type.

16. A method for managing transactions between a hard logic component and a configurable logic component of a memory controller, the method comprising:

receiving, at a first component implemented in configurable logic, a transaction from a memory, wherein the first component is associated with a first memory type of the memory; and storing, at a second component implemented in hard logic, the transaction in a transaction buffer pool configured to store the transactions, wherein the second component is associated with the first memory type and a second memory type, and the second component provides capacity information associated with the transaction buffer pool to the first component to manage transactions between the first component implemented in the configurable logic and the second component implemented in the hard logic.

17. The method of claim 16, wherein the first component is incompatible with the second memory type.

* * * * *